US012729661B2

(12) United States Patent
Kim et al.

(10) Patent No.: US 12,729,661 B2
(45) Date of Patent: Sep. 8, 2026

(54) FUEL PUMP SHUTOFF VALVE FOR LIQUIDFIED PETROLEUM INJECTION ENGINE

(71) Applicants: HYUNDAI MOTOR COMPANY, Seoul (KR); KIA CORPORATION, Seoul (KR)

(72) Inventors: Chang Han Kim, Gwangju (KR); Man Seok Oh, Yongin-si (KR); Seung Hoon Choi, Seoul (KR); Seung Yup Oh, Incheon (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 109 days.

(21) Appl. No.: 18/776,710

(22) Filed: Jul. 18, 2024

(65) Prior Publication Data

US 2025/0146459 A1 May 8, 2025

(30) Foreign Application Priority Data

Nov. 7, 2023 (KR) ........................ 10-2023-0152241

(51) Int. Cl.
*F16K 31/60* (2006.01)
*F02M 37/00* (2006.01)

(52) U.S. Cl.
CPC .... *F02M 37/0011* (2013.01); *F02M 37/0047* (2013.01); *F16K 31/60* (2013.01)

(58) Field of Classification Search
CPC ........... F02M 37/0011; F02M 37/0047; F02M 21/0212; F02M 21/0221; F02M 21/0242; F16K 31/60
See application file for complete search history.

(56) References Cited

U.S. PATENT DOCUMENTS 4,428,351 A * 1/1984 Davis ..................... F02M 37/28 123/557
8,714,194 B2 * 5/2014 Kim .................. F02M 21/0212 417/423.3
10,184,613 B2 * 1/2019 Kim .......................... F17C 5/02
10,344,713 B2 * 7/2019 Kim ........................ F17C 13/00
10,655,752 B2 * 5/2020 Weisgurt ............... F16K 31/602
11,639,702 B2 * 5/2023 Kim ..................... F02M 25/089 123/520
12,240,317 B2 * 3/2025 Choi .................... B60K 15/077

FOREIGN PATENT DOCUMENTS

KR 20120008682 A 2/2012
KR 20230046458 A * 4/2023 ......... F02M 21/0242

OTHER PUBLICATIONS

KR-20230046458 Translation (Year: 2023).*

* cited by examiner

*Primary Examiner* — Umashankar Venkatesan
(74) *Attorney, Agent, or Firm* — Lempia Summerfield Katz LLC

(57) ABSTRACT

A shutoff valve structure of a liquefied petroleum injection (LPI) engine includes an operation valve disposed within a pump housing in a fuel pump and configured to allow or block the flow of fuel from the fuel pump. The shutoff valve structure includes an extension including a knob disposed outside the pump housing and connected to the operation valve by being extended into the pump housing. The operation valve is operable by the knob.

20 Claims, 12 Drawing Sheets

FIG. 1A “PRIOR ART”
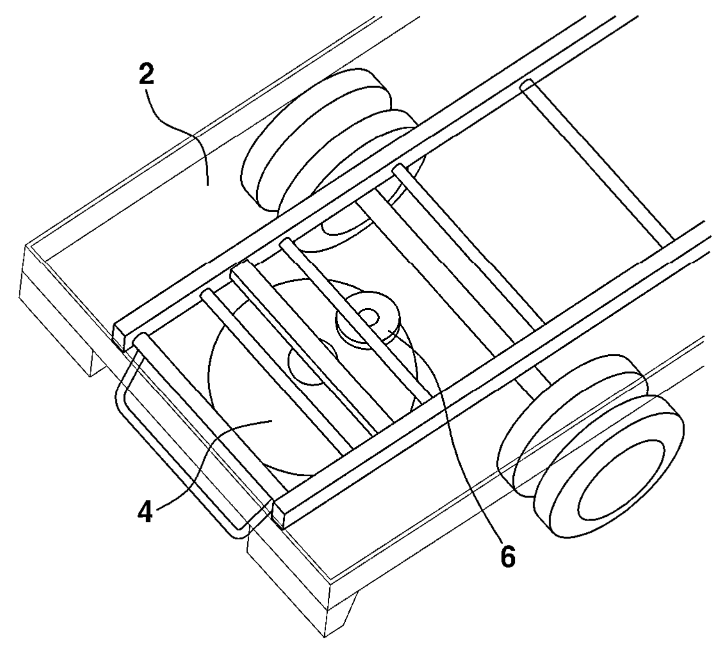
FIG. 1B “PRIOR ART”
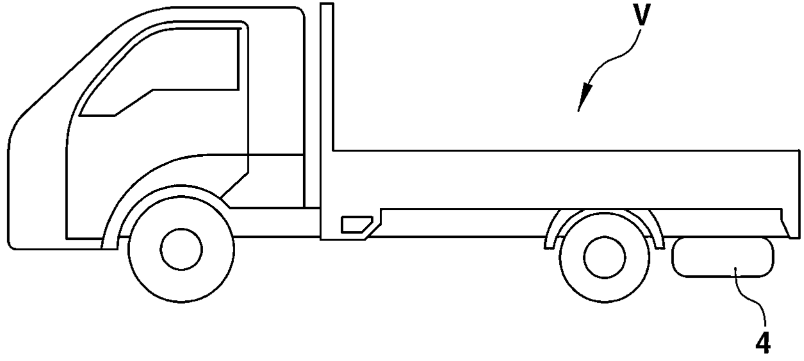

FUEL PUMP SHUTOFF VALVE FOR LIQUIDFIED PETROLEUM INJECTION ENGINE

CROSS-REFERENCE TO RELATED APPLICATION

This application claims, under 35 U.S.C. § 119(a), the benefit of and priority to Korean Patent Application No. 10-2023-0152241, filed on Nov. 7, 2023, the entire contents of which are incorporated herein by reference.

TECHNICAL FIELD

The present disclosure relates to a valve. More particularly, it relates to a shutoff valve structure of a liquefied petroleum injection (LPI) engine.

BACKGROUND

In a liquefied petroleum injection (LPI) engine, liquefied petroleum gas (LPG) fuel is injected directly into the engine. Specifically, in the LPI engine, fuel is supplied to a fuel supply line by a fuel pump installed in an LPG tank or LPG pressure vessel where LPG fuel is stored, and the fuel may be supplied to each cylinder of the engine using an injector.

Due to the nature of a pressure-resistant container of a vehicle, the fuel pump must be equipped with a shutoff valve for safety reasons. The shutoff valve performs the function of blocking the fuel supply line through which LPG fuel moves to the engine by a manual operation when the vehicle is not in use for a long period of time.

In a passenger vehicle having the LPI engine, there is no major difficulty in operating the shutoff valve. However, as illustrated in FIGS. 1A and 1B, in a small commercial vehicle V, an LPG tank 4 is mounted on the underbody of the vehicle, e.g., underneath a deck 2 where cargo is loaded. The shutoff valve is located at the upper portion of the tank 4 through a fuel pump 6, and thus it is difficult to access the shutoff valve for manipulation. Due to the nature of the deck 2 where cargo is loaded, it is difficult to create a hole for access to the shutoff valve. Even if there is a hole, a cover must be installed on the deck 2 to cover the hole, and the shutoff valve may be manipulated only after removing both the cover on the deck 2 and the cover on the tank 4.

The safety regulations for pressure-resistant containers in Korea also require that a container valve attached to the container be easily manipulated. However, the current difficult access to the shutoff valve is not only inconvenient but is also unable to satisfy safety regulations.

The above information disclosed in this Background section is provided only to enhance understanding of the background of the present disclosure, and therefore it may contain information that does not form the prior art that is already known to a person of ordinary skill in the art.

SUMMARY

The present disclosure has been made in an effort to solve the above-described problems associated with the prior art, and it is an object of the present disclosure to provide a valve structure easily accessible to a shutoff valve in a small commercial vehicle.

Another object of the present disclosure is to provide a valve structure that complies with valve-related safety regulations.

Still another object of the present disclosure is to provide a valve structure capable of preventing damage to its designed function caused by attaching and detaching a fuel pump cover.

The object of the present disclosure is not limited to the foregoing, and other objects not mentioned herein should be clearly understood by those of ordinary skill in the art to which the present disclosure pertains (hereinafter, "those skilled in the art") based on the description below.

The features of the present disclosure to achieve the objects of the present disclosure as described above and perform the characteristic functions of the present disclosure are discussed in detail below.

In one aspect of the present disclosure, a valve structure includes: an operation valve disposed within a pump housing in a fuel pump and capable of allowing or blocking the flow of fuel from the fuel pump; and an extension including a knob disposed outside the pump housing and connected to the operation valve by being extended into the pump housing. The operation valve may be operable by the knob.

In another aspect of the present disclosure, a fuel supply system includes: a liquefied petroleum gas (LPG) tank where LPG is stored; a liquefied petroleum injection (LPI) engine to which LPG is supplied from the LPG tank; and a fuel pump installed in the LPG tank and configured to pump the LPG stored in the LPG tank to the LPI engine. Here, the fuel pump may include: an operation valve disposed within a pump housing in the fuel pump and configured to control the flow of fuel from the fuel pump, and an extension including a knob disposed outside the pump housing and connected to the operation valve by being extended into the pump housing. The operation valve may be operable by the knob.

In still another aspect, the present disclosure provides a vehicle including the valve structure or the fuel supply system.

Other aspects and embodiments of the present disclosure are further discussed below.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The above and other features of the present disclosure are discussed infra.

BRIEF DESCRIPTION OF THE DRAWINGS

The above and other features of the present disclosure are now described in detail with reference to certain exemplary embodiments thereof illustrated in the accompanying drawings which are given hereinbelow by way of illustration only, and thus are not limitative of the present disclosure, and wherein:

FIGS. 1A and 1B illustrate the position of a liquefied petroleum gas (LPG) tank in a small commercial vehicle;

FIG. 3C illustrates the fuel pump of FIG. 3A from which a cover is removed;

Figures 2, 3A:
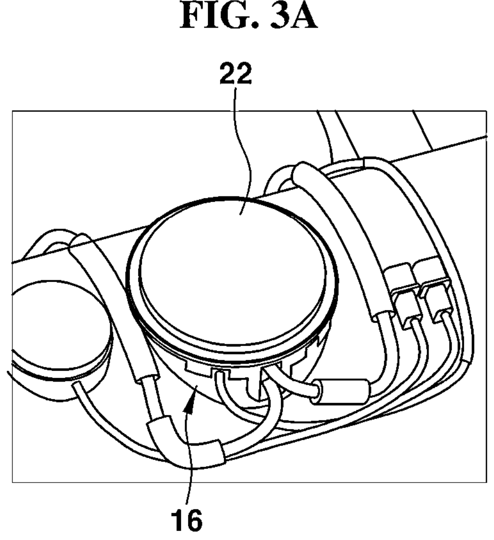
FIG. 2 shows the configuration of a liquefied petroleum injection (LPI) system of a vehicle in an embodiment of the present disclosure.
FIG. 3A illustrates a fuel pump provided in an LPG tank according to an embodiment of the present disclosure.

It should be understood that the appended drawings are not necessarily to scale, presenting a somewhat simplified representation of various features illustrative of the basic principles of the present disclosure. The specific design features of the present disclosure, including, for example, specific dimensions, orientations, locations, and shapes, should be determined in part by the particular intended application and usage environment.

In the figures, the reference numbers refer to the same or equivalent parts of the present disclosure throughout the several figures of the drawing.

DETAILED DESCRIPTION

Descriptions of specific structures or functions presented in the embodiments of the present disclosure are merely exemplary for the purpose of explaining the embodiments according to the concept of the present disclosure, and the embodiments according to the concept of the present disclosure may be implemented in various forms. In addition, the descriptions should not be construed as being limited to the embodiments described herein, and should be understood to include all modifications, equivalents and substitutes falling within the idea and scope of the present disclosure.

Meanwhile, in the present disclosure, terms such as "first" and/or "second" may be used to describe various components, but the components are not limited by the terms. These terms are only used to distinguish one component from another. For example, a first component could be termed a second component, and similarly, a second component could be termed a first component, without departing from the scope of embodiments of the present disclosure.

It should be understood that, when a component is referred to as being "connected to" another component, the component may be directly connected to the other component, or intervening components may also be present. In contrast, when a component is referred to as being "directly connected to" another component, there is no intervening component present. Other terms used to describe relationships between components should be interpreted in a like fashion (e.g., "between" versus "directly between," "adjacent" versus "directly adjacent," etc.).

Throughout the specification, like reference numerals indicate like components. The terminology used herein is for the purpose of illustrating embodiments and is not intended to limit the present disclosure. In this specification, the singular form includes the plural sense, unless specified otherwise. The terms "comprises" and/or "comprising" used in this specification mean that the cited component, step, operation, and/or element does not exclude the presence or addition of one or more of other components, steps, operations, and/or elements.

When a component, device, element, or the like of the present disclosure is described as having a purpose or performing an operation, function, or the like, the component, device, or element should be considered herein as being "configured to" meet that purpose or to perform that operation or function.

Hereinafter, the present disclosure is described in detail with reference to the accompanying drawings.

FIG. 2 illustrates a fuel supply system configured to supply fuel to an LPI engine 10. LPG fuel may be charged in an LPG tank or bombe (hereinafter "LPG tank" or "tank") 14 through a charge line 12. A fuel pump 16 is installed in the tank 14 and configured to pump the fuel stored in the tank 14 and supply the pumped fuel to the engine 10. A shutoff valve 18 is installed at an upper portion of the tank 14 or at an upper portion of the fuel pump 16. The fuel pumped by the fuel pump 16 may be supplied to the engine 10 through a fuel supply line 20.

As described above, especially in a small commercial vehicle, access to the shutoff valve 18 is difficult and thus it is hard to satisfy safety regulations. Moreover, attaching and detaching a cover 22 of the fuel pump 16 to access the shutoff valve 18 may affect vehicle performance.

Figure 3B:
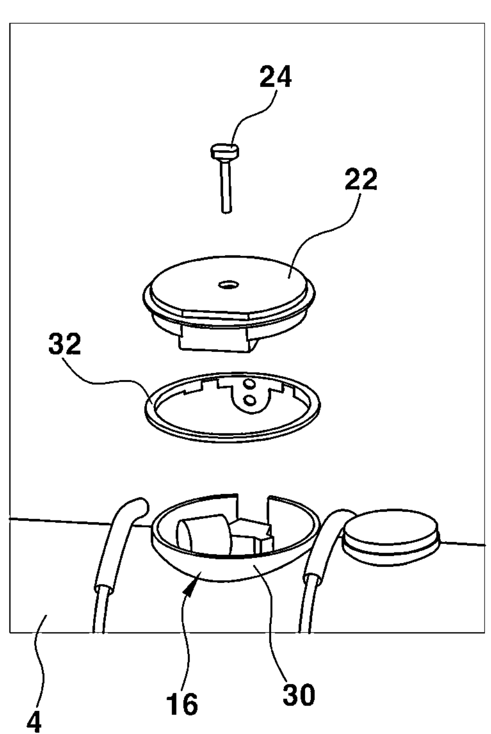
FIG. 3B illustrates an exploded perspective view of the fuel pump of FIG. 3A.
Figure 3C:
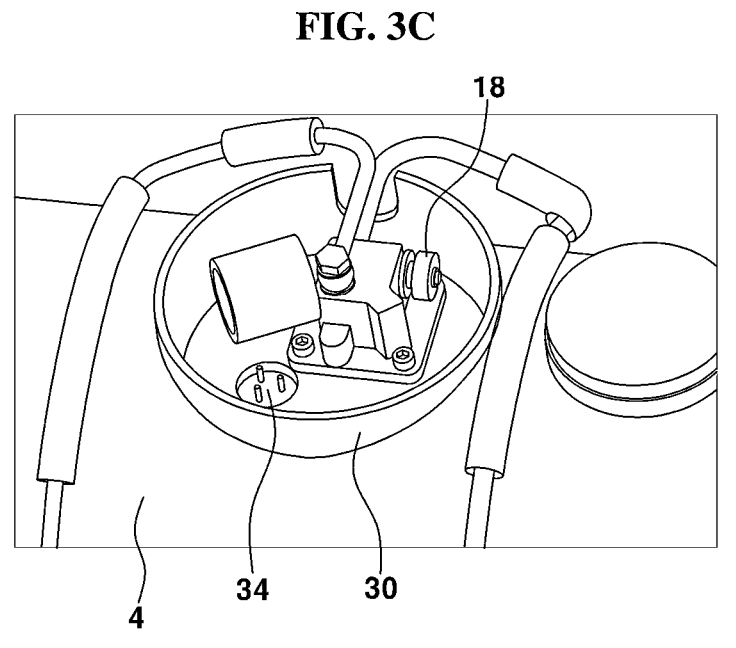

For example, as illustrated in FIGS. 3A to 3C, in order to manipulate the shutoff valve 18, the cover 22 of the fuel pump 16 must be removed. The cover 22 may be detached by unfastening a fastener 24. A packing 32 for water tightness is installed between the cover 22 and a pump housing 30. When the cover 22 is reassembled without checking the correct position of the packing 32 after being detached, the watertight performance of the packing 32 may be reduced. Particularly, at the actual use stage of the vehicle used by the vehicle user, other than at the vehicle production stage, it is not possible to check whether the packing 32 is properly positioned. When the packing 32 is not assembled in a correct position, moisture may be introduced into the cover 22 or into the pump housing 30, causing problems. For example, when moisture penetrates into a power connector 34 of the fuel pump 16, the vehicle may be turned off.

For this reason, the present disclosure provides a valve structure capable of solving the above-mentioned problems.

Figure 4:
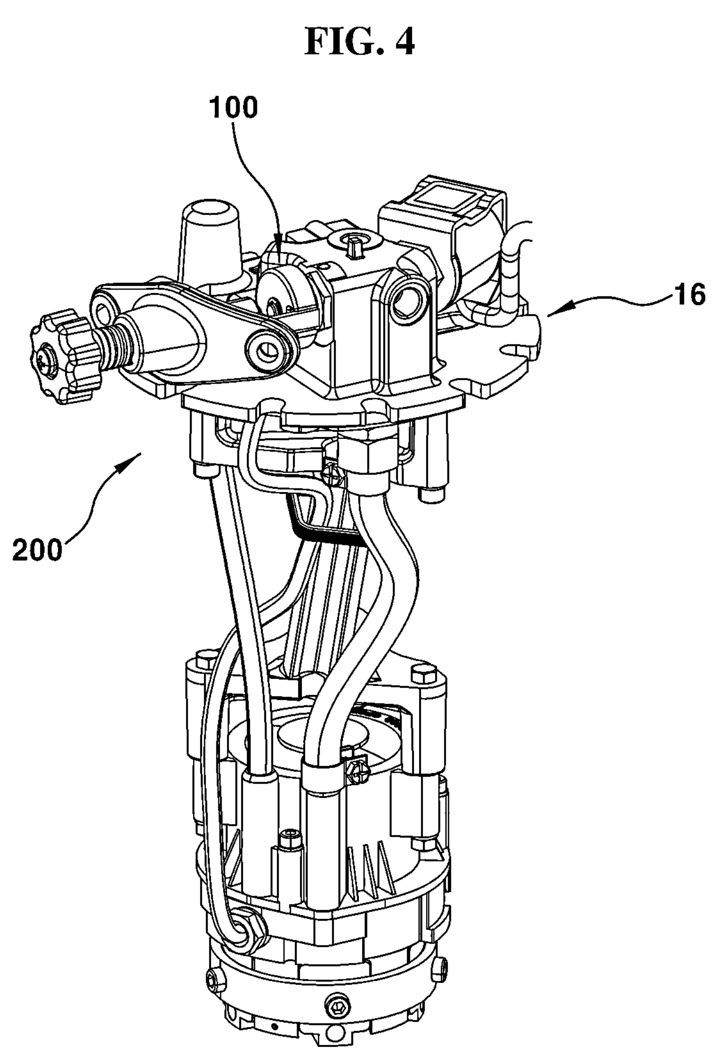
FIGS. 4 and 5A illustrate a valve structure according to an embodiment of the present disclosure installed in a fuel pump.

Referring to FIG. 4, the valve structure according to the present disclosure includes an operation valve 100 and an extension 200.

The operation valve 100 is a shutoff valve directly connected to the fuel pump 16. The flow of LPG fuel to the fuel supply line 20 may be blocked by manipulation of the operation valve 100. According to an implementation of the present disclosure, the operation valve 100 may be configured to axially move by rotation. The operation valve 100 may axially move to change the position of the shutoff valve 18. For example, the operation valve 100 may move in a first axial direction by rotating in a first direction (e.g., clockwise) and may move in a second axial direction by rotating in a second direction (e.g., counterclockwise).

The extension 200 is connected to the operation valve 100. The extension 200 may be connected to the operation valve 100 in such a way that a user may easily manipulate the shutoff valve 18 from outside.

Figure 5A:
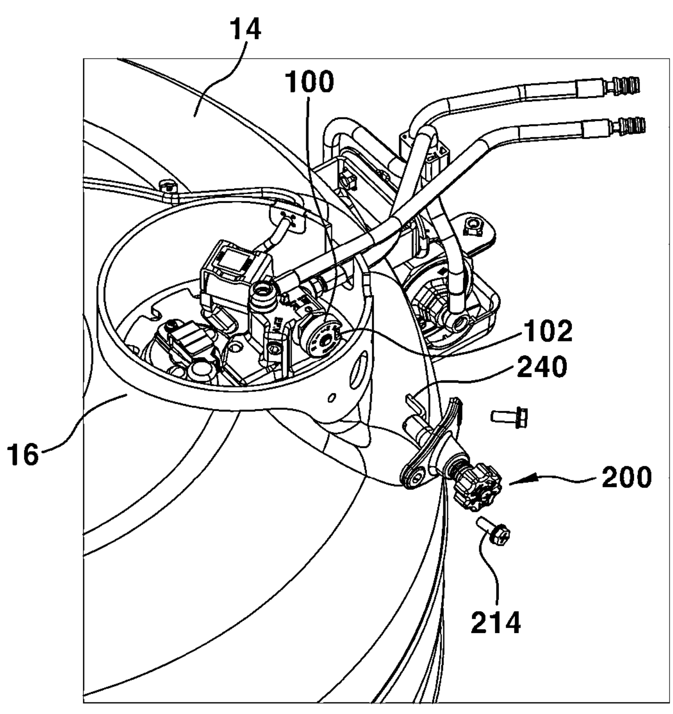
Figure 5B:
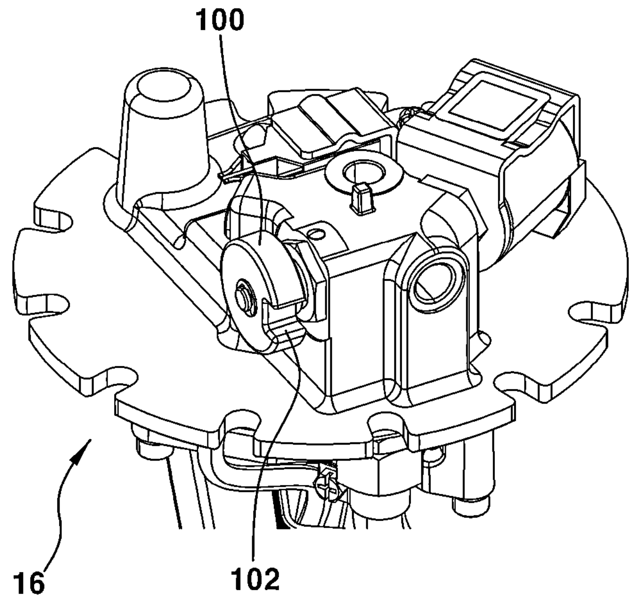
FIG. 5B illustrates an operation valve of a valve structure installed in a fuel pump according to an embodiment of the present disclosure.

Referring to FIGS. 5A and 5B, in one implementation, the operation valve 100 includes an engaging portion 102, and the extension 200 includes a hook 240 connected to the engaging portion 102. With this structure, the position of the operation valve 100 may change by the operation of the hook 240 or the extension 200.

Figure 6A:
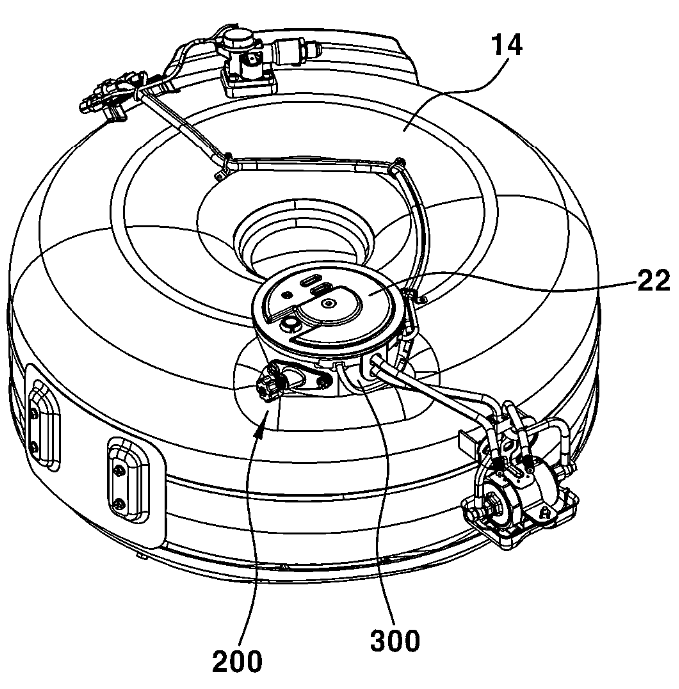
FIG. 6A illustrates an LPG tank including a valve structure according to an embodiment of the present disclosure.
Figure 6B:
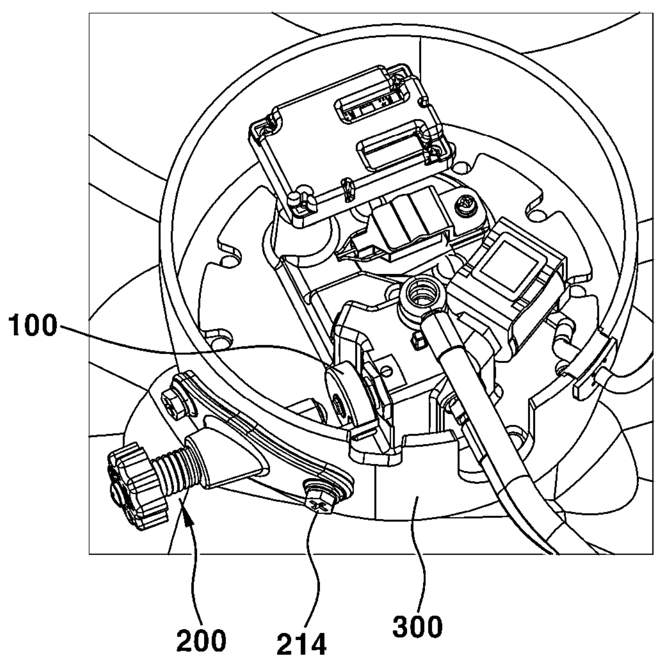
FIG. 6B illustrates the fuel pump of FIG. 6A from which a cover is removed.

As illustrated in FIGS. 6A and 6B, specifically, the operation valve 100 is disposed within the fuel pump 16. The operation valve 100 may be disposed in a space defined by the cover 22 and a pump housing 300. The extension 200 is mounted at an external portion of the fuel pump 16. A portion of the extension 200 may be connected to the operation valve 100 by extending into the fuel pump 16.

Figures 7, 8:
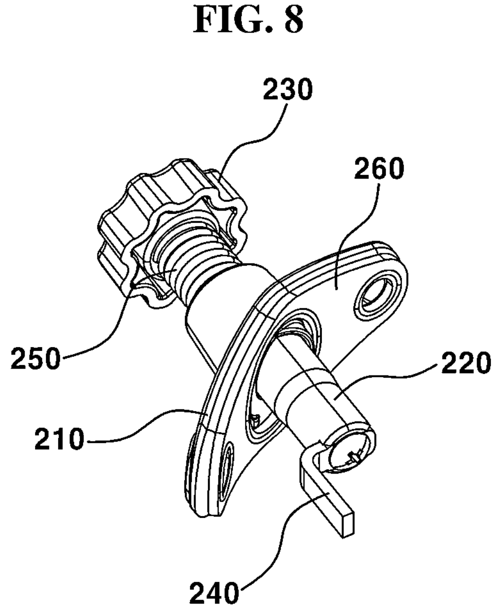
FIG. 7 illustrates an extension of a valve structure according to an embodiment of the present disclosure.
FIG. 8 is a different view of the extension of FIG. 7.

As illustrated in FIGS. 7 and 8, the extension 200 includes a base 210 and a rod 220 rotatably inserted into the base 210. The base 210 is fixed to the external portion of the fuel pump 16. For example, the base 210 may be fixed to the enclosure of the fuel pump 16, i.e., the pump housing 300 or the cover 22. A fastening hole 212 may be formed in the base 210. The base 210 may be fixed to the external portion of the fuel pump 16 by a fastening member 214 (e.g., a bolt) passing through the fastening hole 212. To this end, a mounting hole 320 is formed in the fuel pump 16, and the fastening member 214 may pass the mounting hole 320 (see FIG. 9).

The rod 220 extends through the base 210. For example, the base 210 may penetrate the base 210 through an insertion hole 216. A portion of the rod 220 passing through the base 210 may be disposed within the fuel pump 16. To this end, in one implementation, a hole 310 may be formed in the fuel pump 16. The hole 310 may be formed in the cover 22 or in the pump housing 300.

In an embodiment, a knob 230 is mounted at one end of the rod 220, and the hook 240 is mounted at the other end of the rod 220. The rod 220 may rotate by the rotation of the knob 230, and the hook 240 may rotate according to the rotation of the rod 220. The knob 230 is easily accessible by the user, and the operation valve 100 which is a shutoff valve may be opened or closed when the user rotates the knob 230. In one implementation, the hook 240 may include a bent portion. The hook 240 has an overall inverted shape and may extend from the rod 220.

Figures 9, 10:
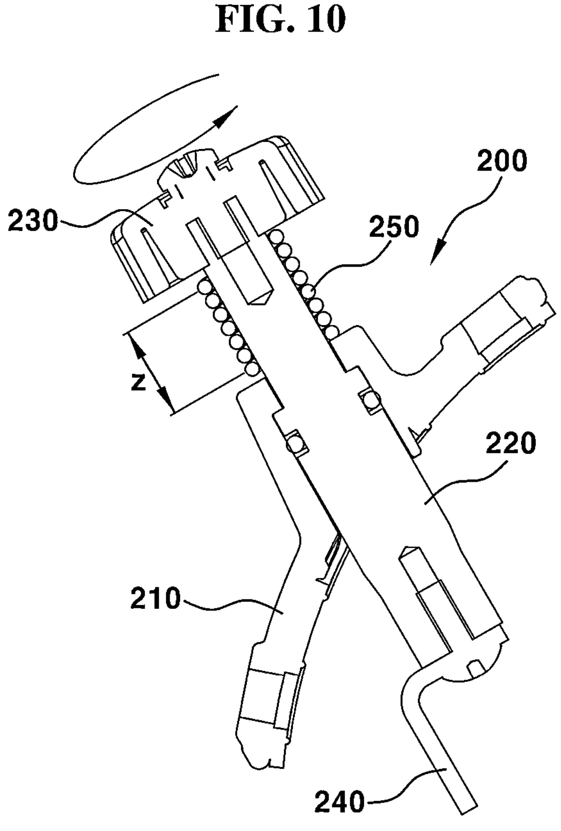
FIG. 9 illustrates a pump housing for a valve structure according to an embodiment of the present disclosure.
FIG. 10 is a cross-sectional view of an extension of a valve structure according to an embodiment of the present disclosure.

As illustrated in FIG. 10, the rod 220 is coupled to the base 210 such that the rod 220 is not movable in an axial direction "z". To this end, in one implementation, a restraining element 250 may be disposed between the base 210 and the knob 230. For example, the restraining element 250 may be a spring with high rigidity.

Figure 11:
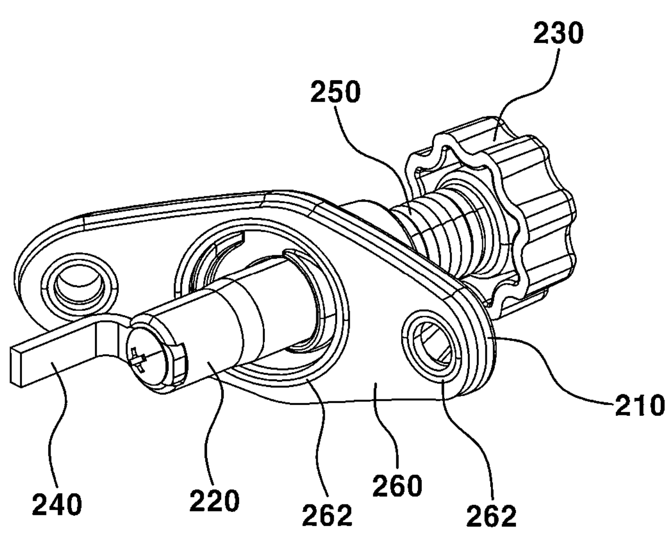
FIG. 11 is a different view of the extension of FIG. 7.

Referring to FIG. 11, a packing member 260 may adhere to the base 210. The packing member 260 may be provided at a surface of the base 210 where the base 210 comes into contact with the fuel pump 16. The packing member 260 allows the base 210 to maintain air tightness or water tightness by being in close contact with the external surface of the fuel pump 16. With this structure, the possibility of moisture inflow into the fuel pump 16 caused by the connection between the extension 200 at the external portion of the fuel pump 16 and the operation valve 100 within the fuel pump 16 may be prevented or eliminated. In some implementations, the packing member 260 has protrusions 262. The protrusions 262 may surround the fastening hole 212 and the insertion hole 216, respectively. The protrusion 262 may improve water tightness.

In some implementations, the seating surface of the base 210 may have the same shape as the pump housing 300. The packing member 260 may also have substantially the same shape as the seating surface of the base 210, allowing modularization of the extension 200 to the pump housing 300 and improving adhesion therebetween to provide excellent airtight or watertight performance.

Figure 12:
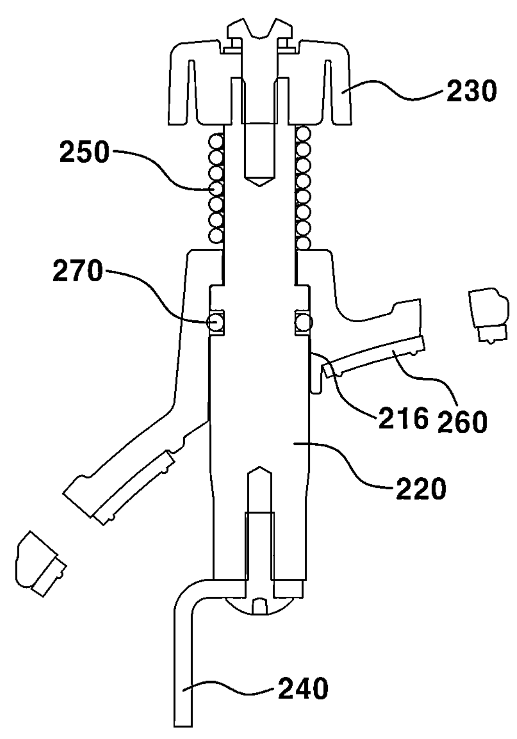
FIG. 12 is a cross-sectional view of an extension of a valve structure according to an embodiment of the present disclosure.

According to an implementation of the present disclosure, as illustrated in FIG. 12, an O-ring 270 may be mounted on the rod 220. Particularly, the O-ring 270 may be disposed at the outer circumferential surface of the rod 220 inserted into the insertion hole 216 in the base 210. The O-ring 270 may further block moisture that may flow into the base 210 through the insertion hole 216.

According to the present disclosure, water tightness may be further secured by the O-ring 270 being disposed at a portion where water tightness may be reduced due to the insertion hole 216 in the base 210. Additionally, the packing member 260 and the protrusion 262 may increase water tightness by keeping portions, such as the hole 310 and the mounting hole 320 in the pump housing 300, that may affect water tightness watertight.

Figure 13A:
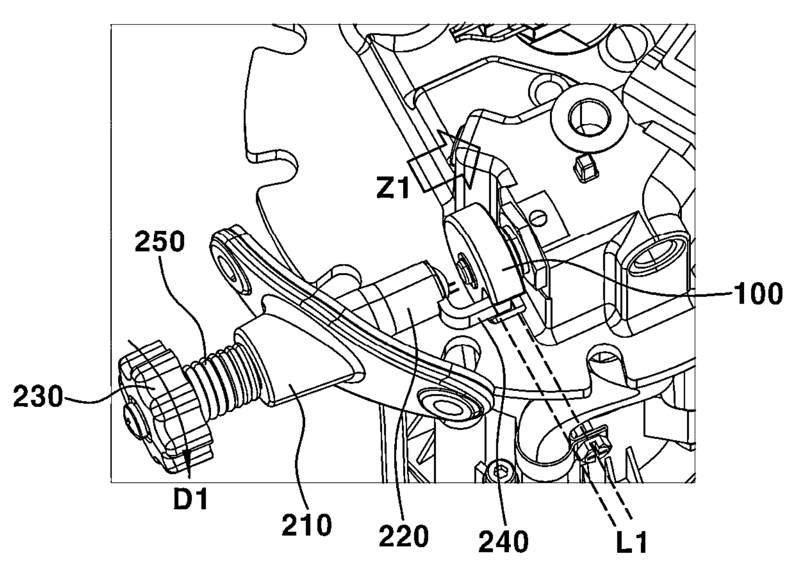
FIGS. 13A and 13B illustrate the opening and closing process of a valve structure according to an embodiment of the present disclosure.
Figure 13B:
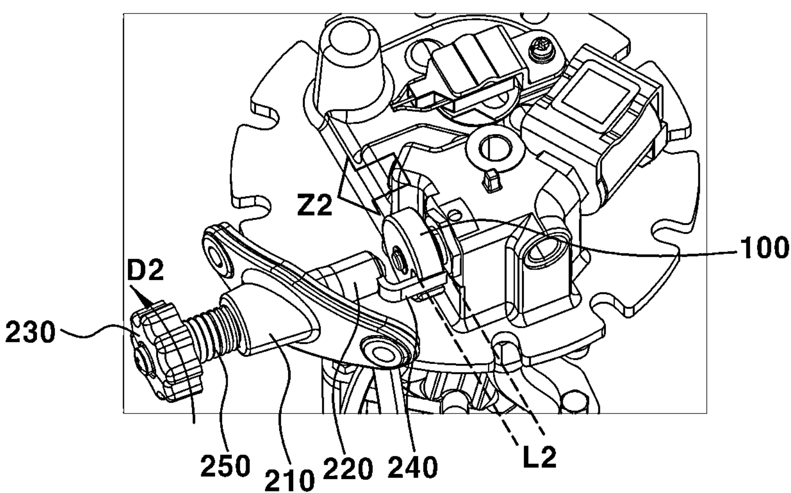

Referring to FIGS. 13A and 13B, the operation of the valve structure according to the present disclosure may be explained. FIG. 13A illustrates a closing operation of the shutoff valve. When the knob 230 is rotated clockwise D1, the rod 220 does not move in the axial direction z but rotate clockwise D1, owing to the restraining element 250. The hook 240 coupled to the rotatable rod 220 is engaged with the engaging portion 102. As the hook 240 also rotates clockwise D1, the operation valve 100 engaged with the hook 240 is also rotated clockwise D1. Here, the operation valve 100 moves in a first axial direction Z1 to be placed in a closed position, blocking the flow of fuel supplied to the fuel supply line 20. Because the operation valve 100 moves in the first axial direction Z1 in the closed position, an overlapping length L1 of the hook 240 engaged with the operation valve 100 is reduced compared to that in an open position.

As illustrated in FIG. 13B, the operation valve 100 or the shutoff valve may be placed in the open position by an operation contrary to the closing operation of the shutoff valve. When the knob 230 is rotated counterclockwise D2, the rod 220 does not move in the axial direction z but rotate counterclockwise D2, owing to the restraining element 250. The hook 240 coupled to the rotatable rod 220 is engaged with the engaging portion 102. As the hook 240 is also rotated counterclockwise D2, the operation valve 100 engaged with the hook 240 is also rotated counterclockwise D2. Here, the operation valve 100 moves in a second axial direction Z2 to be placed in the open position, allowing the fuel to be supplied to the engine 10 through the fuel supply line 20. Because the operation valve 100 moves in the second axial direction Z2, an overlapping length L2 of the hook 240 engaged with the operation valve 100 is increased compared to that in the closed position.

In operating the valve structure according to the present disclosure, an appropriate torque may be sufficient, without having to use a large force or a too small amount of torque. As clearly illustrated in FIG. 13B, this is because the hook 240 has an extra length so that the hook 240 may move beyond the engaging portion 102.

Figure 14:
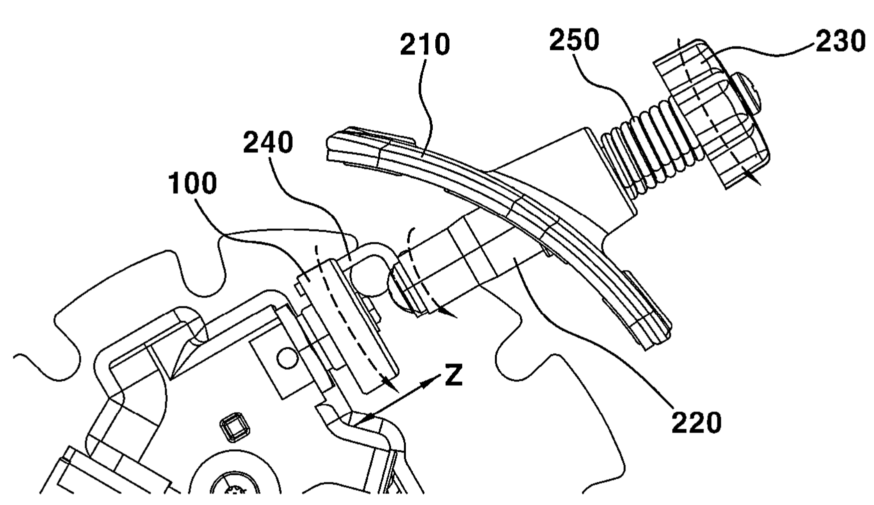
FIG. 14 illustrates a valve structure according to an embodiment of the present disclosure.

Referring to FIG. 14, in the valve structure according to the present disclosure, the operation valve 100 may smoothly rotate and move by manipulating the extension 200. Because the hook 240 is coupled to the operation valve 100 at a position radially offset with respect to the central axis of the knob 230 or the rod 220, the operation valve 100 may be easily rotated and moved.

Figure 15:
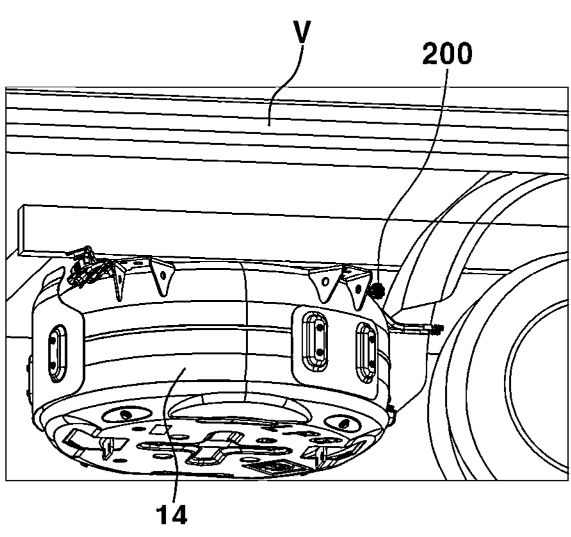
FIG. 15 illustrates an LPG tank including a valve structure as installed to a vehicle according to an embodiment of the present disclosure.

As illustrated in FIG. 15, according to the present disclosure, easy accessibility is provided for manipulating the shutoff valve. In other words, the valve structure according to the present disclosure may be easily manipulated from outside. When a user puts his hand from a side of a vehicle V and rotates the knob 230 of the extension 200 to manipulate the operation valve 100, the flow of LPG fuel from the fuel pump 16 may be easily blocked. Moreover, according to the present disclosure, the cover 22 does not need to be detached when manipulating the valve structure, whereby the water tightness of the fuel pump 16 may be maintained.

As is apparent from the above description, the present disclosure provides the following effects.

According to the present disclosure, provided is a valve structure easily accessible to a shutoff valve in a small commercial vehicle.

According to the present disclosure, provided is a valve structure that complies with valve-related safety regulations.

According to the present disclosure, provided is a valve structure capable of preventing damage to its designed function caused by attaching and detaching a fuel pump cover.

Effects of the present disclosure are not limited to what has been described above, and other effects not mentioned herein should be clearly recognized by those having ordinary skill in the art based on the above description.

It should be apparent to those of ordinary skill in the art to which the present disclosure pertains that the present disclosure described above is not limited by the above-described embodiments and the accompanying drawings, and various substitutions, modifications and changes are possible within a range that does not depart from the technical idea of the present disclosure.

What is claimed is:

1. A valve structure comprising:

an operation valve disposed within a pump housing of a fuel pump and configured to control a flow of fuel from the fuel pump; and an extension comprising a knob disposed outside the pump housing and connected to the operation valve by being extended into the pump housing, wherein the operation valve is operable by the knob, wherein the operation valve is configured to block the flow of the fuel by rotating together with the extension rotating in a first direction to move in a first axial direction of the operation valve.

2. The valve structure claim 1, wherein the operation valve is configured to allow the flow of the fuel by rotating together with the extension rotating in a second direction to move in a second axial direction of the operation valve.

3. The valve structure of claim 1, wherein the extension comprises:

a base mounted on an external surface of the pump housing;

a rotatable rod extending through the base into the pump housing, wherein a first end of the rotatable rod is connected to the knob; and a hook mounted to a second end of the rotatable rod and connected to the operation valve.

4. The valve structure of claim 3, further comprising a restraining element disposed between the knob and the base on an outer circumferential surface of the rotatable rod, the restraining element configured to regulate an axial movement of the rotatable rod.

5. The valve structure of claim 4, wherein the restraining element is a spring.

6. The valve structure of claim 3, wherein the extension further comprises a packing member mounted on the base and being in contact with an external surface of the pump housing.

7. The valve structure of claim 3, wherein the extension comprises an O-ring mounted between the rotatable rod and the base.

8. The valve structure of claim 3, wherein the hook extends radially outward from the rotatable rod and then extends in an axial direction of the rotatable rod.

9. The valve structure of claim 3, wherein the hook is coupled to the operation valve at a position radially offset from a central axis of the knob.

10. The valve structure of claim 3, wherein:

the base comprises an insertion hole through which the rotatable rod passes, and the pump housing comprises a hole configured to allow the rotatable rod passing through the insertion hole to pass therethrough.

11. The valve structure of claim 10, wherein:

the base comprises a fastening hole for coupling to the pump housing, and the pump housing comprises a mounting hole configured to allow a fastening member passing through the fastening hole to pass therethrough.

12. The valve structure of claim 11, further comprising a packing member mounted on the base, being in contact with the external surface of the pump housing, wherein the packing member comprises a protrusion, wherein the protrusion is configured to protrude from a circumferential portion of the insertion hole and from a circumferential portion of the fastening hole.

13. The valve structure of claim 1, wherein the operation valve comprises an engaging portion configured to be engaged with the extension.

14. A fuel supply system comprising:

a liquefied petroleum gas (LPG) tank where LPG is stored;

a liquefied petroleum injection (LPI) engine to which LPG is supplied from the LPG tank; and a fuel pump installed in the LPG tank and configured to pump the LPG stored in the LPG tank to the LPI engine, wherein the fuel pump comprises:

an operation valve disposed within a pump housing in the fuel pump and configured to control a flow of fuel from the fuel pump; and an extension comprising a knob disposed outside the pump housing and connected to the operation valve by being extended into the pump housing, wherein the operation valve is operable by the knob, and wherein the extension comprises:

a base mounted on an external surface of the pump housing;

a rotatable rod extending through the base into the pump housing, wherein a first end of the rotatable rod is connected to the knob; and a hook mounted to a second end of the rotatable rod and connected to the operation valve.

15. A vehicle comprising the fuel supply system of claim 14.

16. The fuel supply system of claim 14, wherein the operation valve is configured to block the flow of the fuel by rotating together with the extension rotating in a first direction to move in a first axial direction of the operation valve, and wherein the operation valve is configured to allow the flow of the fuel by rotating together with the extension rotating in a second direction to move in a second axial direction of the operation valve.

17. The fuel supply system of claim 14, further comprising a restraining element disposed between the knob and the base on an outer circumferential surface of the rotatable rod, the restraining element configured to regulate an axial movement of the rotatable rod.

18. The fuel supply system of claim 14, wherein the extension further comprises a packing member mounted on the base and being in contact with an external surface of the pump housing.

19. The fuel supply system of claim 14, wherein the hook extends radially outward from the rotatable rod and then extends in an axial direction of the rotatable rod.

20. The fuel supply system of claim 14, wherein the hook is coupled to the operation valve at a position radially offset from a central axis of the knob.

* * * * *